2,836,582

COPOLYMERS OF TRIFLUOROETHYLENE AND VINYL CARBOXYLATES

John M. Hoyt, Woodside, N. Y., assignor, by mesne assignments, to Minnesota Mining and Manufacturing Company, St. Paul, Minn., a corporation of Delaware No Drawing. Application December 14, 1954
Serial No. 475,313

6 Claims. (Cl. 260—87.1)

This invention relates to novel copolymers of trifluoroethylene with vinyl carboxylates having at least five carbon atoms.

In accordance with the present invention trifluoroethylene is copolymerized with vinyl carboxylates containing at least five carbon atoms to produce copolymers which are useful in producing films, foils, fibers and adhesives. The copolymers range from waxy materials to higher molecular weight plastic and rubbery materials which can be fabricated into a wide variety of shaped and useful articles.

These copolymers of trifluoroethylene with vinyl carboxylates are, on the one hand, superior to the homopolymers of the parent vinyl carboxylates in being much less sensitive to water and in having, in some cases, softening points sufficiently high to permit their use in the production of plastic articles. On the other hand, these copolymers of trifluoroethylene with vinyl carboxylates exhibit to a significant degree the desirable properties found in the homopolymers of trifluoroethylene, such as high thermal and chemical resistivity, but offer the advantage, as compared with the homopolymers, of increased workability.

The copolymers of the invention are particularly useful as durable, flexible coatings for application to metal and fabric surfaces which are used in contact with strong chemical reagents. When used for this purpose, the copolymers may be dissolved in various solvents, exemplary of which are the saturated cyclic ethers, the glycol ethers, ketones, the aliphatic and aromatic esters and the halogenated hydrocarbons. Specific examples of these solvents are tetrahydrofuran, tetrahydropyran, dioxane, ethylene glycol monomethyl ether, ethylene glycol dimethyl ether, di-isobutyl ketone, methyl ethyl ketone, methyl isobutyl ketone, ethyl acetate, amyl acetate, ethyl benzoate, carbon tetrachloride, and 1,1,3-trichlorotrifluoroethane.

Dispersions of the polymers may be prepared, for example, from solutions of the copolymers in the above solvents. The copolymers may also be combined with or prepared in the presence of plasticizers, stabilizers, fillers, pigments, dyes, softeners, natural resins or other synthetic resins. Vulcanizing agents may be included in any of these solutions or compositions, in which case vulcanization is generally accomplished by the application of heat.

Among the vinyl carboxylates, containing at least five carbon atoms, which may be used, are vinyl propionate, vinyl butyrate, vinyl benzoate, and vinyl stearate. In general, any vinyl carboxylate having from five to 20 carbon atoms may be copolymerized with the trifluoroethylene.

The copolymers of the invention may contain from about 5 to 99 mole percent of trifluoroethylene. It has been found, however, that a feed containing a prescribed molar ratio of vinyl carboxylate and trifluoroethylene does not produce a copolymer having the same composition as the feed stock or charge. In order to obtain a copolymer containing between about 5 and 99 mole percent of trifluoroethylene, based upon the total weight of comonomers present in the copolymer, it is necessary to employ a charge containing from 3 to 99 mole percent of the trifluoroethylene, based upon the total weight of comonomers present in the comonomer charge. To produce the preferred copolymers containing about 20 to 95 mole percent of trifluoroethylene, based upon the total weight of comonomers present in the copolymer, it is necessary to employ a comonomer charge containing from about 10 to 98 mole percent of the trifluoroethylene, based upon the total weight of comonomers present in the comonomer charge. When the content of trifluoroethylene in the copolymer product is increased in the range of 50 to 99 mole percent, the copolymers possess a marked improvement in moisture resistance, and have relatively high softening points. As the molar percentage of trifluoroethylene in the copolymer is diminished, i. e., when the content of trifluoroethylene in the copolymer product is under 10 mole percent of the trifluoroethylene, the copolymers more nearly resemble the homopolymer of the parent vinyl carboxylate.

The copolymers of the invention may be prepared in various comonomer ratios, as previously described, and by employing a water suspension type catalyst system as the preferred catalyst system. In this system, a redox catalyst is employed which comprises an oxidant and a reductant. The oxidant is preferably an inorganic persulfate, such as potassium persulfate, sodium persulfate, or ammonium persulfate, and the reductant is preferably a bisulfite, such as potassium bisulfite, sodium bisulfite, potassium metabisulfite, or sodium metabisulfite. The oxidant is used in a quantity equivalent to about 0.1 to 5 parts by weight per 100 parts of total monomers present and preferably is used in a quantity equivalent to 0.5 to 2 parts by weight per 100 parts of total comonomers present. The reductant such as sodium metabisulfite may be used in a quantity equivalent to 0.05 to 5.0 parts by weight per 100 parts of total comonomers present and preferably is employed in the range of 0.1 to 2 parts by weight per 100 parts of total comonomers present. A buffering compound, such as sodium tetraborate, may also be employed, if desired, together with the oxidant and reductant. About 0.01 to 1 part by weight, per 100 parts of total comonomers present, of a variable valence metal salt may also be used, this variable valence metal salt preferably being an iron salt, such as ferrous sulfate or ferrous nitrate. The salts serve as activators. The reductant and the variable valence metal salt may be eliminated, if desired, and the comonomers may be polymerized in a water suspension system which contains the oxidant only.

The preferred temperature range for conducting the polymerization reactions of the invention is from —30° to 30° C., and excellent results have been obtained when the reaction is conducted at a temperature of 20° C., particularly when using a water suspension system.

It is often advantageous to add to the water suspension type catalyst system a dispersing or emulsifying agent. Examples of these agents are the salts, preferably the ammonium, sodium or potassium salts, of polyfluorocarboxylic acids or perfluorochlorocarboxylic acids, and other dispersing or emulsifying agents for vinyl acetate polymerizations known to the art, such as dioctyl sodium sulfosuccinate, the salts of maleic anhydride-vinyl acetate or maleic anhydride-styrene copolymers, polyvinyl alcohol and sodium cellulose glycolate. The ammonium, sodium or potassium salts of polyfluorocarboxylic acids and perfluorochlorocarboxylic acids are preferred, and are generally present in a quantity between about 0.5 and 10 parts by weight per 100 parts of total comonomers present. The copolymerization is desirably conducted under mildly alkaline conditions, at an initial pH no higher than 9, to minimize hydrolysis of the vinyl carboxylate comonomer. The pH may be controlled, if desired, by addition of a suitable buffer such as disodium phosphate ($Na_2HPO_3 \cdot 9H_2O$). The polyfluorocarboxylic acids which may be used are those disclosed in U. S. Patent No. 2,559,752, and the derivatives of the acids disclosed therein as being efficacious dispersing agents in polymerization reactions may also be employed in the process of the present invention. The perfluorochlorocarboxylic acids which may be used in the process of the present invention are those disclosed in copending application Serial No. 463,073, filed October 18, 1954, as being useful as dispersing agents in polymerization reactions.

The copolymerization reactions also may be carried out in a mass or bulk polymerization system employing an organic peroxide promoter at a temperature which is preferably between −30° and +30° C. Of the organic peroxide promoters which may be employed, halogen-substituted acetyl peroxides, such as trichloroacetyl peroxide, are preferred within this temperature range. Typical examples of other halogen-substituted organic peroxides which are suitable for carrying out the copolymerizations in a mass system within a temperature range from about −30° to about 30° C. are trifluoroacetyl peroxide, difluoroacetyl peroxide, chloroacetyl peroxide, and perfluoropropionyl peroxide.

The copolymerization may also be conducted in solution in various solvents, of which benzene and t-butyl alcohol are exemplary and preferred. The amount of solvent used may vary from about 5 to 95 percent by weight of the total solution, with 40 to 60 percent being the preferred amount. The solution copolymerizations are conducted at a temperature between about −30° and +30° C., using the same promoters described for bulk or mass copolymerization. The solution copolymerizations may also be conducted at a temperature in the range of 30° to 150° C., in which case acetyl peroxide, benzoyl peroxide, 2,4-dichlorobenzoyl peroxide, lauroyl peroxide, or di-t-butyl peroxide may be used as a promoter.

The time of reaction may be in the range of 0.1 to 100 hours.

Polymerization modifiers may also be used to reduce the molecular weight of the copolymer products and thereby increase the solubility and ease of processing thereof. Exemplary of such modifiers are chloroform, carbon tetrachloride, trichloroacetyl chloride, bromotrichloromethane, and dodecyl mercaptan. These modifiers are generally added in quantities between about 0.1 to 10 parts by weight per 100 parts of total comonomers charged. Dodecyl mercaptan appears much more powerful in function, however, and is preferably employed in quantities ranging from 0.01 to 0.3 part per 100 parts of total monomer charged to the polymerization reaction. Of these modifiers, chloroform is preferred.

The invention will be further illustrated by reference to the following specific example in which all parts are by weight:

EXAMPLE 1

*Preparation of a copolymer of trifluoroethylene and vinyl butyrate*

The following water suspension redox catalyst system was employed in carrying out the polymerization reaction:

| | Parts by weight |
|---|---|
| Water | 200.0 |
| Total monomers | 100.0 |
| Ammonium persulfate | 1.0 |
| Sodium metabisulfite | 0.4 |
| Ferrous sulfate | 0.1 |

A heavy-walled glass polymerization tube was flushed with nitrogen and charged with 120 parts of deionized water and 40 parts of an aqueous solution containing 1.0 part of dissolved ammonium persulfate. The tube was then immersed in a freezing bath consisting of a solid carbon dioxide-trichloroethylene slush. When the contents of the tube were frozen solid, 20 parts of an aqueous solution containing 0.4 part of dissolved sodium metabisulfite ($Na_2S_2O_5$), 20 parts of an aqueous solution containing 0.1 part of dissolved ferrous sulfate ($FeSO_4 \cdot 7H_2O$)

and 58 parts of redistilled vinyl butyrate were added. The tube was placed in the freezing bath after each addition to freeze each ingredient solid before the next was added. The tube was then connected to a gas-transfer system, frozen with liquid nitrogen, and evacuated. Thereafter, the tube was charged with 42 parts of trifluoroethylene corresponding to a monomer charge containing 50 mole percent of trifluoroethylene. The polymerization was conducted for a period of 1.5 hours at a temperature of 20° C. It was then placed in a freezing bath to coagulate the polymer and finally vented. The coagulated polymer was dissolved in acetone and reprecipitated by pouring into a 50:50 methanol-water mixture, to remove unreacted vinyl butyrate. The collected precipitated polymer was washed thoroughly with a 50:50 methanol-water mixture and dried in vacuo at a temperature of 35° C.

A rubbery product was obtained in a 5.8% conversion; and was found to contain 25 mole percent of trifluoroethylene, based on the fluorine analysis (13.60° F.).

It will be obvious to those skilled in the art that many modifications may be made within the scope of the present invention without departing from the spirit thereof, and the invention includes all such modifications.

I claim:

1. A copolymer of about 5 to about 99 mole percent trifluoroethylene and correspondingly about 95 to about 1 mole percent of a vinyl carboxylate having at least 5 carbon atoms.

2. A copolymer of about 5 to about 99 mole percent trifluoroethylene and correspondingly about 95 to about 1 mole percent vinyl butyrate.

3. A process which comprises copolymerizing a reaction mixture containing about 3 to about 99 mole percent trifluoroethylene and correspondingly about 97 to about 1 mole percent of a vinyl carboxylate having from 5 to 20 carbon atoms, in a water suspension system in the presence of an inorganic persulfate and a bisulfite, at a temperature in the range of about 0 to 30° C.

4. A copolymer of about 20 to about 95 mole percent trifluoroethylene and correspondingly about 80 to about 5 mole percent of a vinyl carboxylate having at least 5 carbon atoms.

5. A copolymer of about 20 to about 95 mole percent trifluoroethylene and correspondingly about 80 to about 5 mole percent vinyl butyrate.

6. A process which comprises copolymerizing a reaction mixture containing about 10 to about 98 mole percent trifluoroethylene and correspondingly about 90 to about 2 mole percent of a vinyl carboxylate having at least 5 carbon atoms, in a water-suspension system in the presence of an inorganic persulfate and a bisulfite at a temperature in the range of about 0 to 30° C.

References Cited in the file of this patent

UNITED STATES PATENTS

| 2,462,354 | Brubaker et al. | Feb. 22, 1949 |
| 2,584,126 | Hanford | Feb. 5, 1952 |

FOREIGN PATENTS

| 462,855 | Canada | Jan. 31, 1950 |